United States Patent
Raj et al.

(10) Patent No.: US 10,498,644 B2
(45) Date of Patent: Dec. 3, 2019

(54) GRACE LINK STATE ADVERTISEMENT (LSA) FROM A VIRTUAL STACK DEVICE

(71) Applicant: HEWLETT PACKARD ENTERPRISE DEVELOPMENT LP, Houston, TX (US)

(72) Inventors: Anil Raj, Bangalore (IN); Anoop Govindan Nair, Bangalore (IN); Venkatavaradhan Devarajan, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 125 days.

(21) Appl. No.: 15/717,000

(22) Filed: Sep. 27, 2017

(65) Prior Publication Data

US 2019/0097926 A1    Mar. 28, 2019

(51) Int. Cl.
| | |
|---|---|
| *H04L 12/775* | (2013.01) |
| *H04L 29/14* | (2006.01) |
| *H04L 12/703* | (2013.01) |
| *H04L 29/08* | (2006.01) |
| *H04L 29/12* | (2006.01) |
| *H04L 12/24* | (2006.01) |

(52) U.S. Cl.
CPC ............ *H04L 45/583* (2013.01); *H04L 45/28* (2013.01); *H04L 67/2814* (2013.01); *H04L 69/40* (2013.01); *H04L 29/12264* (2013.01); *H04L 41/06* (2013.01); *H04L 61/2046* (2013.01)

(58) Field of Classification Search
CPC ....... H04L 45/583; H04L 45/28; H04L 69/40; H04L 41/06; H04L 61/2046; H04L 29/12264; H04L 67/2814
See application file for complete search history.

(56) References Cited

U.S. PATENT DOCUMENTS

| 7,362,700 B2 | 4/2008 | Frick et al. | |
|---|---|---|---|
| 7,593,320 B1 * | 9/2009 | Cohen | H04L 41/0663 370/217 |
| 7,639,605 B2 * | 12/2009 | Narayanan | H04L 49/357 370/219 |

(Continued)

FOREIGN PATENT DOCUMENTS

| CN | 103188811 | 6/2013 |
|---|---|---|

OTHER PUBLICATIONS

CSS Split and Mad, (Research Paper), 2015, 79 Pgs.
IRF Virtualization Technology Framework, (Research Paper), Oct. 12, 2009, 8 Pgs.

*Primary Examiner* — Will W Lin
(74) *Attorney, Agent, or Firm* — Hewlett Packard Enterprise Patent Department

(57) ABSTRACT

Examples disclosed herein relate to a grace link state advertisement (LSA) from a virtual stack device. In an example, a first member network device of a virtual stack device may an input from a Multi-Active Detection (MAD) device. The virtual stack device may be a logical network device comprising the first member network device and a second member network device. Based on the input from the MAD device, the first member network device may determine whether a grace link state advertisement (LSA) is to be sent to a neighbor Open Shortest Path First (OSPF) enabled router by the first member network device, wherein the neighbor OSPF enabled router is an OSPF neighbor to the virtual stack device.

20 Claims, 6 Drawing Sheets

(56) References Cited

U.S. PATENT DOCUMENTS

| | | | | |
|---|---|---|---|---|
| 7,707,443 | B2* | 4/2010 | Chheda | G06F 1/3203 |
| | | | | 361/679.46 |
| 7,978,595 | B2 | 7/2011 | Wang et al. | |
| 8,135,832 | B2* | 3/2012 | Hu | H04L 45/583 |
| | | | | 709/223 |
| 8,339,940 | B2* | 12/2012 | Wang | H04L 69/40 |
| | | | | 370/217 |
| 2002/0046271 | A1* | 4/2002 | Huang | H04L 45/00 |
| | | | | 709/223 |
| 2005/0083953 | A1* | 4/2005 | May | H04L 45/00 |
| | | | | 370/401 |
| 2005/0135357 | A1* | 6/2005 | Riegel | H04L 45/00 |
| | | | | 370/389 |
| 2007/0014231 | A1* | 1/2007 | Sivakumar | H04L 45/04 |
| | | | | 370/216 |
| 2007/0183313 | A1* | 8/2007 | Narayanan | H04L 49/357 |
| | | | | 370/216 |
| 2010/0329111 | A1* | 12/2010 | Wan | H04L 69/40 |
| | | | | 370/218 |
| 2012/0275456 | A1* | 11/2012 | Ammireddy | H04L 45/02 |
| | | | | 370/390 |
| 2014/0173133 | A1* | 6/2014 | Ammireddy | H04L 45/02 |
| | | | | 709/241 |
| 2016/0065433 | A1* | 3/2016 | Hui | H04L 43/0847 |
| | | | | 709/224 |
| 2016/0269293 | A1* | 9/2016 | K A | H04L 45/32 |

\* cited by examiner

GRACE LINK STATE ADVERTISEMENT (LSA) FROM A VIRTUAL STACK DEVICE

BACKGROUND

Routing protocols have evolved over the years to match the growing complexity of computer networks. Routing protocols specify how routers in a computer network communicate and share information with each other. Routing protocols allow routers to dynamically learn about routes that may exist on a network, build routing tables and perform routing decisions. Open Shortest Path First (OSPF) is an example of a routing protocol.

BRIEF DESCRIPTION OF THE DRAWINGS

For a better understanding of the solution, examples will now be described, purely by way of example, with reference to the accompanying drawings, in which.

DETAILED DESCRIPTION

Figure 1:
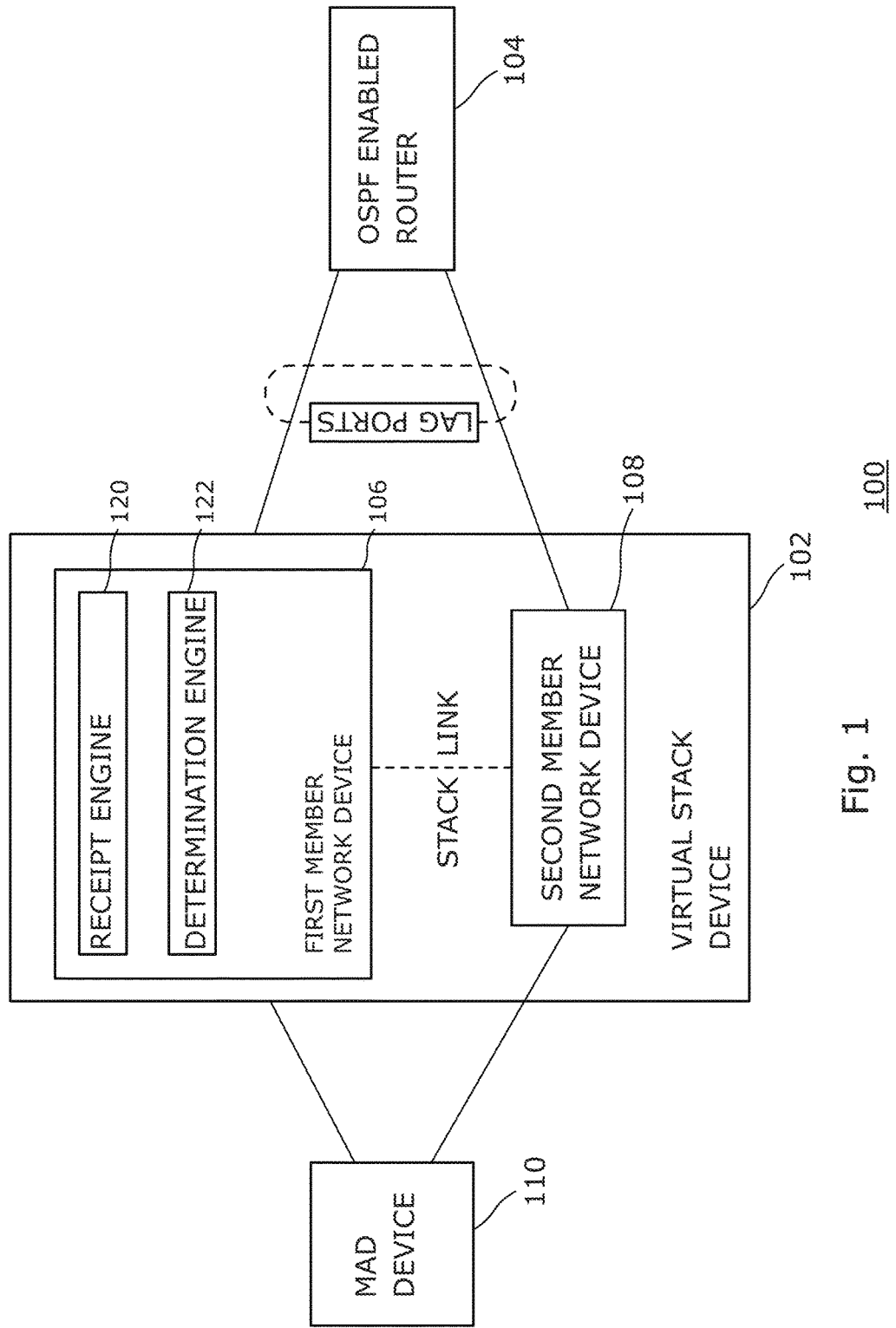
FIG. 1 is a block diagram of an example computing environment for managing a grace link state advertisement (LSA) from a virtual stack device.

Stacking technology enables two or more devices to be communicatively coupled through physical ports to form a virtual (logical) stack device. The virtual stack device may be used to manage and maintain multiple physical network devices. From the perspective of both management plane and data plane, the "stack device" may operate as a single virtual device.

In an example virtual stack device, there may be an active device in the stack. Other devices in the stack may act as standby devices. The active device may manage the control plane, whereas both the active and standby devices may run the data plane and forward data.

In an example, a stack split may occur when a stack link becomes disconnected resulting in two or more active devices. All active devices may remain active until a Multi-Active Detection device determines that one or more devices should become inactive. If a stack split is not immediately detected, it may impact the functionality of multiple applications as the link aggregation group (LAG) ports may still be load-sharing and carrying traffic to all the members (which are independent now). OSPF is one such protocols that may get affected, and the stack split may cause adjacency losses and route deletion, which may impact data forwarding.

In case of a failover, the workload on the active device of a virtual stack device may be automatically transferred to one of the standby members. A restarting OSPF router or a router undergoing failover generates a grace LSA specifying the 'grace period' that indicates to its neighbors the time that the neighbors should continue to consider this router as fully adjacent. To support nonstop forwarding during failover, OSPF protocol should send a grace LSA immediately after the new active device takes over indicating that the forwarding table on its peers should not be disturbed.

When the virtual stack device splits, a standby device is not expected to take over as active device, and traffic forwarding should remain unaffected. During a stack spilt, both the stack fragments may be active for a period of time which may cause the standby device to send grace LSA thinking that the active device has gone down. Further, since both the stack fragments may be active, the acknowledgement for OSPF grace LSA packet may be received by the active device instead of the standby device. Since packets are sent/received out of order (since both the members are active for a short period of time), it results in OSPF control packets not being delivered to the correct recipient. When an OSPF router receives an out-of-sequence grace LSA, it may break the adjacency, and clear the routing entries received from its peer. This affects the OSPF graceful restart and impacts traffic forwarding until all the routes are relearnt. Needless to say, this is not desirable.

To address these technical challenges, the present disclosure describes various examples for managing a grace link state advertisement (LSA) from a virtual stack device. In an example, a first member network device of a virtual stack device may receive an input from a Multi-Active Detection (MAD) device. The virtual stack device may be a logical network device comprising the first member network device and a second member network device. Based on the input from the MAD device, the first member network device may determine whether a grace link state advertisement (LSA) is to be sent to a neighbor Open Shortest Path First (OSPF) enabled router by the first member network device, wherein the neighbor OSPF enabled router is an OSPF neighbor to the virtual stack device.

FIG. 1 is a block diagram of an example computing environment 100 for managing a grace link state advertisement (LSA) from a virtual stack device. In an example, computing environment 100 may include a virtual stack device 102, an OSPF enabled router 104, and a Multi-Active Detection device 110. Although one virtual stack device, and one OSPF enabled router are shown in FIG. 1, other examples of this disclosure may include more than one virtual stack device and more than one OSPF enabled router.

In an example, virtual stack device 102 may include a first member network device 106 and a second member network device 108. In another example, virtual stack device 102 may include more than two member network devices. In an example, member network devices may be communicatively coupled through a stack link(s) created between two logical ports, which may be associated with physical ports in the member network devices. The virtual stack device 102 may be used to manage and maintain multiple network devices. From the perspective of both management plane and data plane, virtual stack device 102 may operate as a single virtual device.

In an example, there may be an active device (for example, second member network device 108) in virtual stack device 102. Other devices in the stack may act as standby devices (for example, first member network device 106). The active device may manage the control plane, whereas both the active and standby devices may run the data plane and forward data. The role of active device is assumed only by one member network device of virtual stack device 102 at a time.

Member network devices 106 and 108 may each be, for example, a network router, a virtual router, a network switch, and a virtual switch bridge. In an example, member network devices 106 and 108 may each be an OSPF enabled router. In an example, virtual stack device 102 may administer a dynamic routing protocol (for example, OSPF). Virtual stack device 102 may establish neighbor relationship with other network devices in the same area or different areas of network. Virtual stack device 102 may receive route update information from its neighbors. In an example, route update information may be received through a flooding process. For instance, virtual stack device 102 may receive route update information from its neighbor router (for example, 104).

Virtual stack device 102 may construct a topology map of the network by collecting information from all the other network devices. In an example, hello packets may be used to discover and maintain neighbor network devices. The hello packets may contain information such as network device ID, device timers, etc. If the network devices agree on the information they become neighbors. Virtual stack device 102 may build its own route update information and share it with other network devices. Route update information may include information about the state of a link(s) generated by a dynamic routing protocol. For example, in OSPF, route update information may be in form of Link State Advertisements (LSAs). Route update information may include, for example, information about neighbors such as neighbor ID, link type, and bandwidth. It may also include information about an interface such as IP address, subnet mask, type of network, and neighboring routers on the link.

Each network device may flood its route update information to all neighbor routers. The neighbor network devices may store the information, and forward it until all network devices have the same information. Once all the network devices have received the route update information, the network devices may generate a topological map of the network which may be used to determine the best routes to a destination router or node in the network.

In an example, virtual stack device 102 may be communicatively coupled to OSPF enabled router 104 via a computer network. The computer network may be a wireless or wired network. The computer network may include, for example, a Local Area Network (LAN), a Wireless Local Area Network (WAN), a Metropolitan Area Network (MAN), a Storage Area Network (SAN), a Campus Area Network (CAN), or the like. Further, the computer network may be a public network (for example, the Internet) or a private network (for example, an intranet). In an example, the computer network may be an IP network. In an example, virtual stack device 102 may be coupled to an OSPF enabled router 104 via link aggregation group (LAG) ports. Link aggregation is a method of grouping multiple Ethernet ports into a virtual link with aggregated bandwidth. The set of ports in a link aggregation group (LAG) are treated as a single port.

Virtual stack device 102 may appear as a single node on a network. All its member network devices may share the same IP address and Layer 3 configurations such as the routing configurations. If a stack link failure causes the virtual stack device 102 to split, multiple active virtual devices that have the same IP address and Layer 3 configurations may appear on the network. For example, if a stack link coupling the active and standby devices is broken, there may be two or more active devices with the same global configuration in the network. This may cause, for example, routing problems and data loss. Multi-active detection (MAD) device may be used, for example, to detect identical active virtual devices and handle multi-active collisions on a network.

MAD device 110 may protect an active device of virtual stack device 102 from another member device with similar configuration. In an example, MAD device 110 may shut down one of the member devices of virtual stack device 102. In order to detect multiple active devices in a virtual stack device 102, MAD device 110 may use, for example, out-of-band management (OOBM) or Link Layer Discovery Protocol (LLDP). In an example, MAD device 110 may be individually coupled to first member network device 106 and second member network device 108, for example, via Link Layer Discover Protocol (LLDP) links or out-of-band management (OOMB) links. In an example, MAD device 110 may use Simple Network Management Protocol (SNMP) to talk to member network devices of virtual stack device 102 in the event of a split and determine which member devices are active. MAD device 110 may then use that information to decide which member device should be made inactive.

MAD device 110 may be, for example, a network router, a virtual router, a network switch, and a virtual switch bridge. MAD device 110 may be communicatively coupled to member network devices of virtual stack device 102, for example, via a computer network, which may be similar to the computer network described earlier.

In an example, first member network device 106 of virtual stack device 102 may include a receipt engine 120 and a determination engine 122.

Engines 120 and 122 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of first member network device 106. In some examples, the at least one machine-readable storage medium may store instructions that, when executed by the at least one processing resource, at least partially implement some or all engines of first member network device 106. In such examples, first member network device 106 may include the at least one machine-readable storage medium storing the instructions and the at least one processing resource to execute the instructions.

For the sake of simplicity in illustration, first member network device 106 is shown to include receipt engine 120 and determination engine. However, any of the other member network devices (for example, second member network device 108) of virtual stack device 102 may include these engines as well.

In an example, receipt engine 120 on first member network device of virtual stack device 102 may receive an input from Multi-Active Detection (MAD) device. In an example, first member network device may be communicatively coupled to a second member network device via a stack link in virtual stack device 102. In an example, first member network device may be a standby device, and second member device may be an active device, in virtual stack device 102. Second member network device may manage the control plane in virtual stack device 102, and first member network device may be under control of the second member device.

In an example, the input from MAD device 110 may indicate a stack link failure between first member network device 106 and second member network device 108 of virtual stack device 102. In an example, input from MAD device 110 may indicate a failure of second member network device 108.

Based on the input from MAD device 110, determination engine 122 may determine whether a grace link state advertisement (LSA) is to be sent to a neighbor Open Shortest Path First (OSPF) enabled router (for example, 104) by first member network device 106. The neighbor OSPF enabled router may be an OSPF neighbor to virtual stack device 102.

In an example, member network devices (for example, first member network device and second member network device) may implement an architecture wherein the control plane is separate from the data plane. The control plane may be responsible for managing and controlling functions, for example, running a routing protocol such as OSPF. The data plane may be used for data forwarding functions. The separation of data plane from the control plane may enable a router to carry out data forwarding tasks even if the control plane is restarted (for example, due to a route processor crash or software upgrade). This mechanism is called graceful restart (GR).

In an OSPF network, graceful restart may enable an OSPF enabled router (for example, first member network device and second member network device) to stay on the forwarding path even if the OSPF protocol is restarted. During a graceful restart process, a restarting OSPF enabled router ("GR restarter") may send grace-LSAs (Link State Advertisements) to notify its neighbor routers that it will perform graceful restart within a specified amount of time ("grace period"). Neighbor routers (for example, 104) of the restarting router may be called as "helper routers" (or "GR helpers"). A grace-LSA provides an indication to a neighbor router that the restarting router is going to undergo graceful restart within a specified time period ("grace period"). In response to the indication, the neighbor router may enter into a helper mode. During the grace period, the helper routers may continue to announce the restarting router in their LSAs as if they are fully adjacent.

Figure 2:
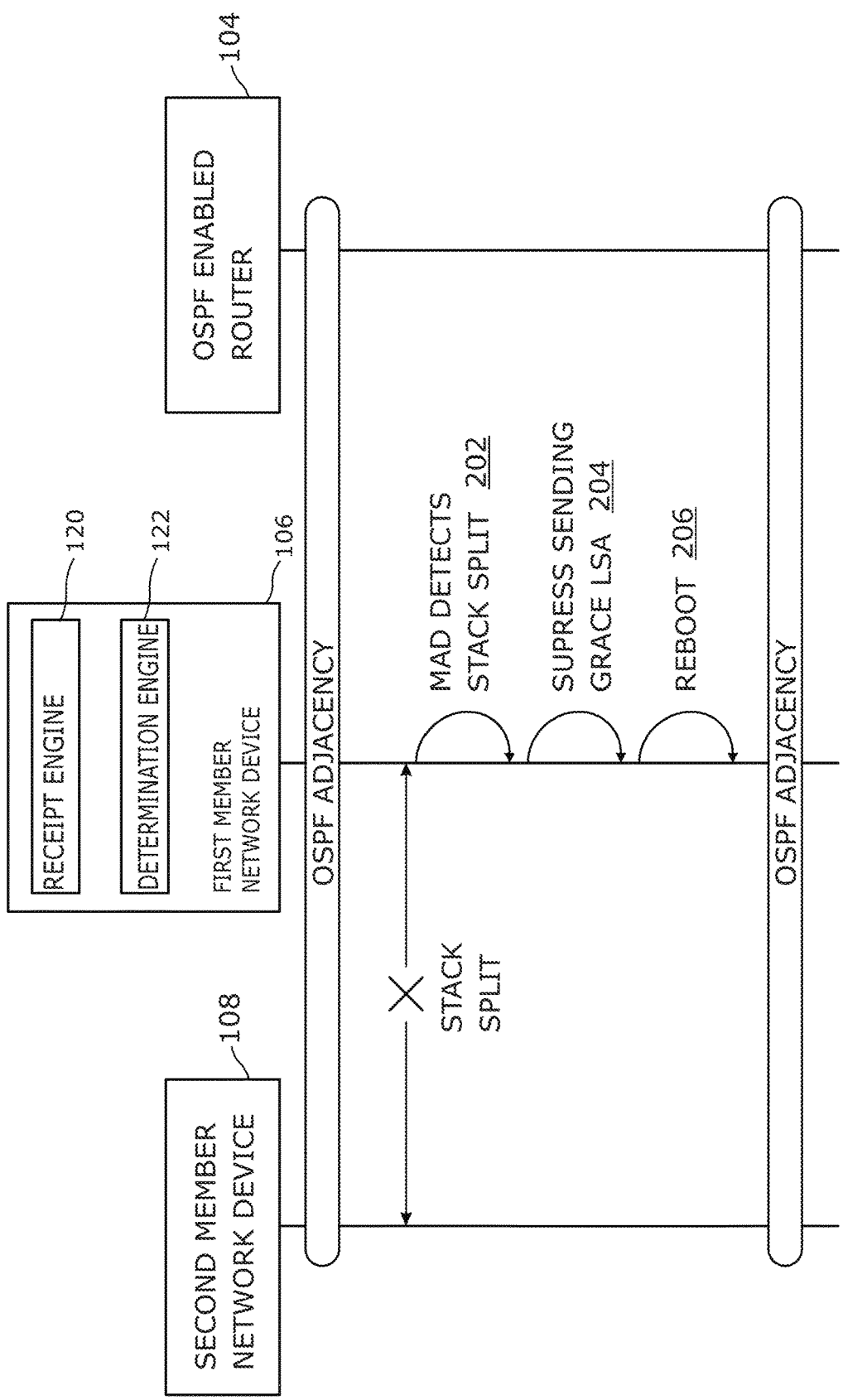
FIG. 2 is a block diagram of an example computing environment illustrating a stack link failure in a virtual stack device.

In an example, illustrated in FIG. 2, in response to a determination that the input from the MAD device 110 indicates a stack link failure between first member network device and second member network device 202, determination engine 122 may suppress transmission of a grace LSA(s) 204 from first member network device ("standby device") to neighbor OSPF enabled router. First member network device may reboot 206. Since second member network device continues to be an active device in virtual stack device 102, and no grace LSAs are sent from second member network device, the adjacency between virtual stack device 102 and neighbor OSPF enabled router is maintained.

Figure 3:
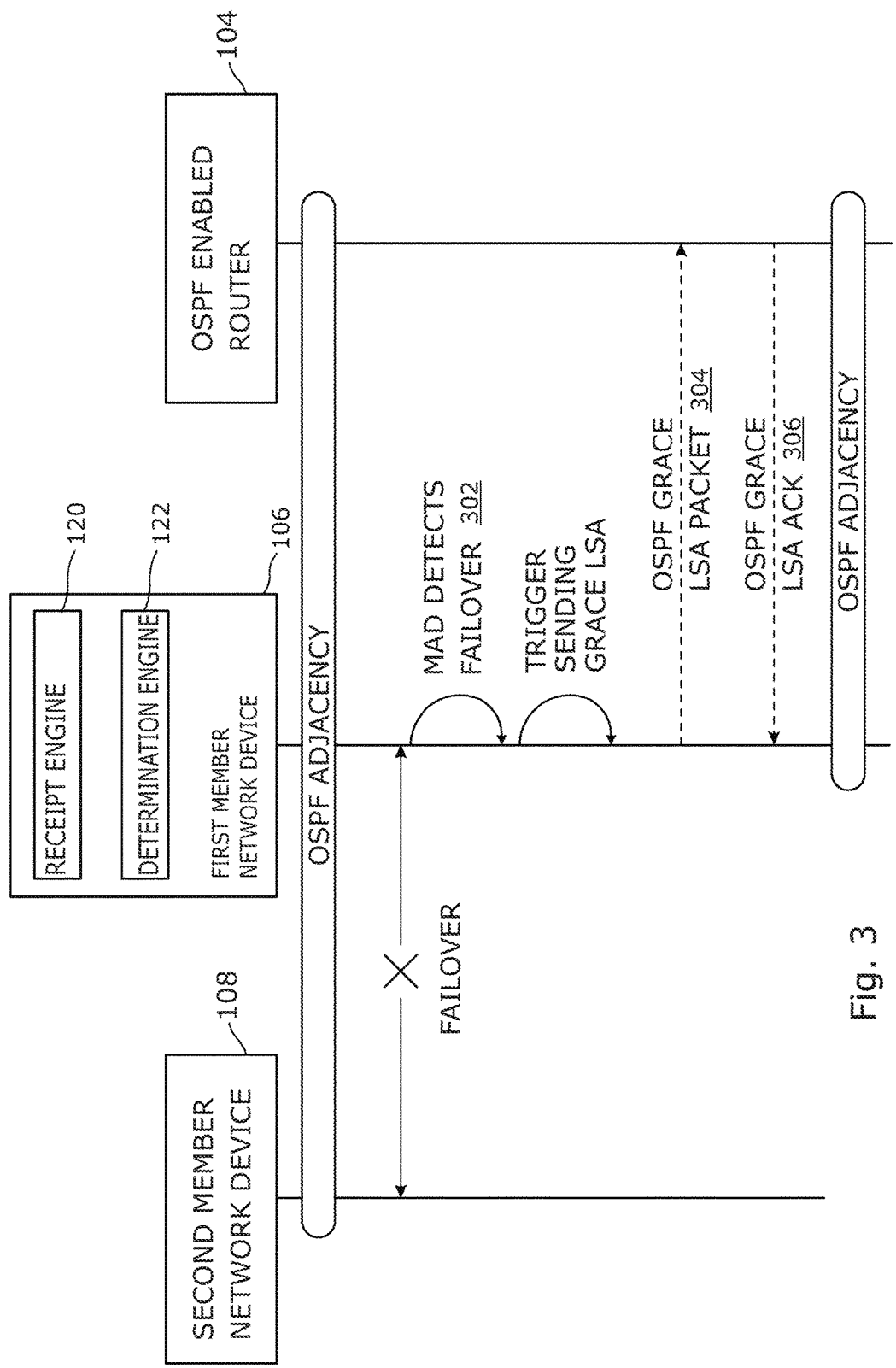
FIG. 3 is a block diagram of an example computing environment illustrating a failover in a virtual stack device.

In an example, illustrated in FIG. 3, in response to a determination that the input from MAD device 110 indicates a failure of second member network device ("active device") 302, determination engine 122 may send a grace LSAs 304 to neighbor OSPF enabled router. In response, first member network device may receive an acknowledgment message 306 from the neighbor OSPF enabled router. Further, first member network device, which was a standby device, may assume the role of an active device in the virtual stack device 102. First member network device may re-learn all the routes again, thereby keeping data plane and traffic forwarding intact. And, second member network device may reboot.

Figure 4:
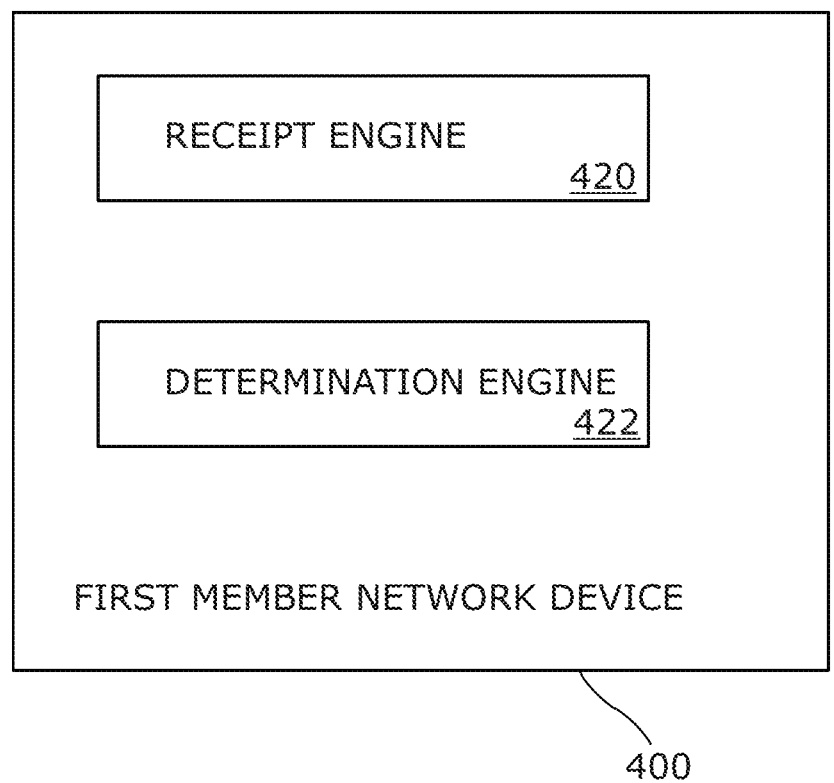
FIG. 4 is a block diagram of an example network device for managing a grace link state advertisement (LSA) from a virtual stack device.

FIG. 4 is a block diagram of an example first member network device 400 for managing a grace link state advertisement (LSA) from a virtual stack device.

In an example, first member network device 400 may be analogous to a member network device (for example, first member network device 106 and second member network device 108) of virtual stack device 102 of FIG. 1, in which like reference numerals correspond to the same or similar, though perhaps not identical, components. For the sake of brevity, components or reference numerals of FIG. 4 having a same or similarly described function in FIG. 1 are not being described in connection with FIG. 4. Said components or reference numerals may be considered alike.

First member network device 400 may include, for instance, a network router, a virtual router, a network switch, a virtual switch, or any network device with routing functionality. In an example, first member network device 400 may be an OSPF enabled router.

In the example of FIG. 4, first member network device 400 may include receipt engine 220 and determination engine 222. In an example, receipt engine 420 and determination engine 422 may be similar to receipt engine 120 and determination engine 122, respectively, described in FIGS. 1 to 3. In an example, first member network device 400 may be a member of a virtual stack device (for example, 102), which may be a logical network device comprising the first member network device and a second member network device. In an example, receipt engine 120 may receive an input from a Multi-Active Detection (MAD) device. Based on the input from the MAD device, determination engine 122 may determine whether a grace link state advertisement (LSA) is to be sent to a neighbor Open Shortest Path First (OSPF) enabled router by first member network device, wherein the neighbor OSPF enabled router is an OSPF neighbor to the virtual stack device. In response to a determination that the input from the MAD device indicates a stack link failure between the first member network device and the second member network device, determination engine 122 may suppress transmission of the grace LSA to the neighbor OSPF enabled router.

Figure 5:
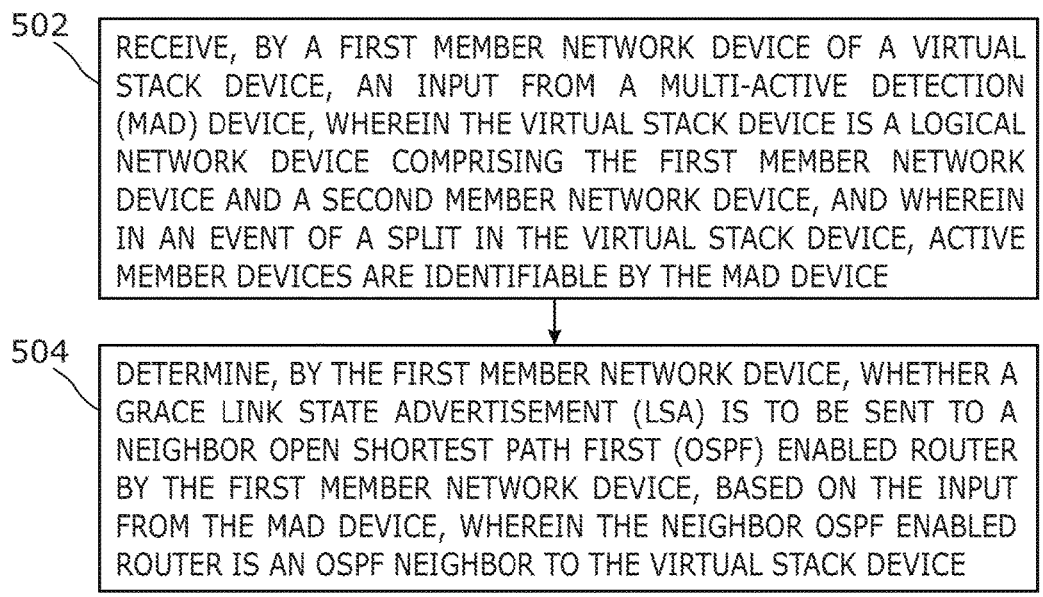
FIG. 5 is a block diagram of an example method of managing a grace link state advertisement (LSA) from a virtual stack device.

FIG. 5 is a block diagram of an example method 500 for managing a grace link state advertisement (LSA) from a virtual stack device. The method 500, which is described below, may be partially or completely executed on first member network device 106 or second member network device 108 of FIG. 1, or first member network device 400 of FIG. 4. However, other suitable network devices may execute method 500 as well. At block 502, a first member network device of a virtual stack device may receive an input from a Multi-Active Detection (MAD) device. The virtual stack device may be a logical network device comprising the first member network device and a second member network device. At block 504, based on the input from the MAD device, the first member network device may determine whether a grace link state advertisement (LSA) is to be sent to a neighbor Open Shortest Path First (OSPF) enabled router by the first member network device, wherein the neighbor OSPF enabled router is an OSPF neighbor to the virtual stack device.

Figure 6:
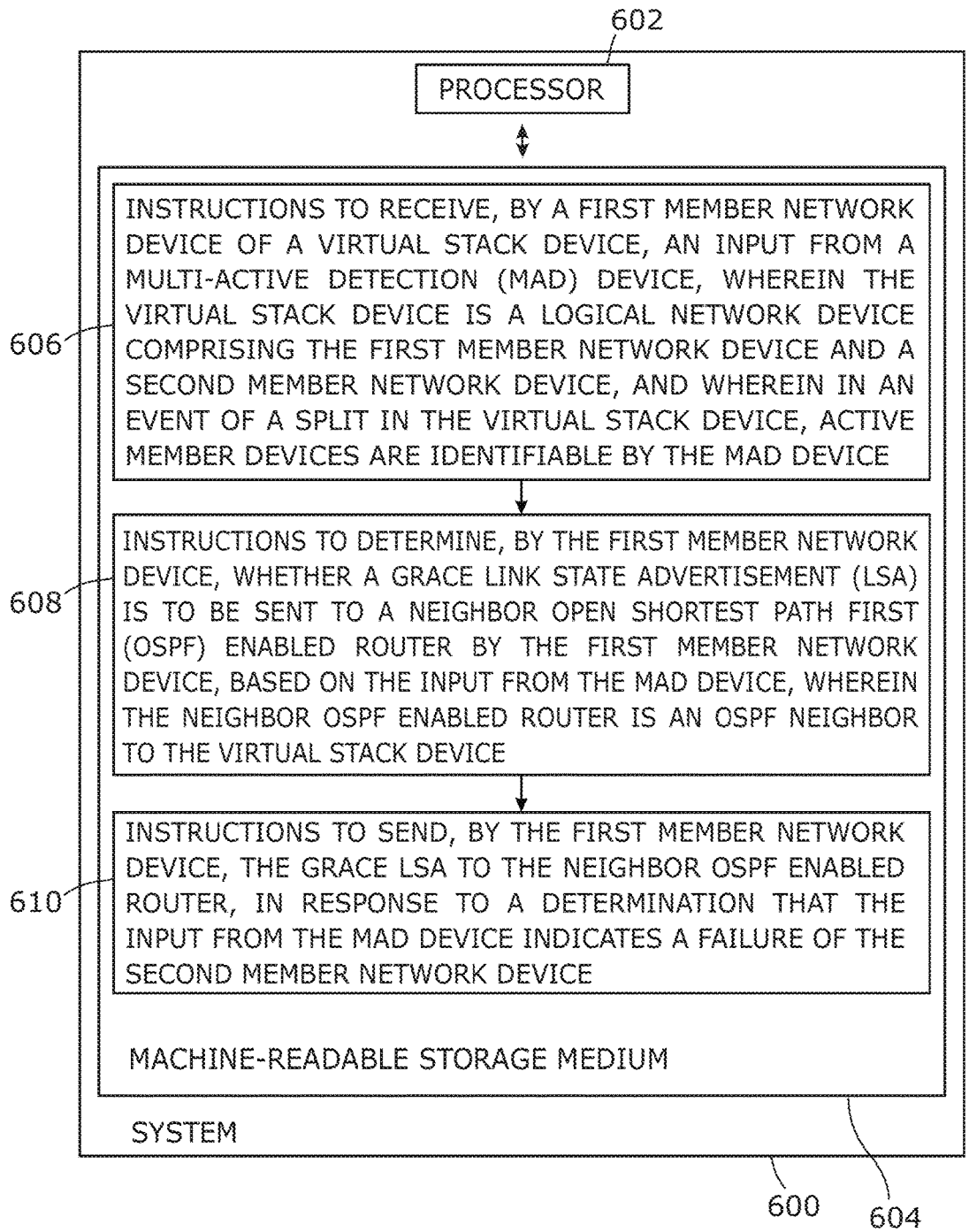
FIG. 6 is a block diagram of an example system including instructions in a machine-readable storage medium for managing a grace link state advertisement (LSA) from a virtual stack device.

FIG. 6 is a block diagram of an example system 600 for managing a grace link state advertisement (LSA) from a virtual stack device. System 600 includes a processor 602 and a machine-readable storage medium 604 communicatively coupled through a system bus. In an example, system 600 may be analogous to first member network device 106 or second member network device 108 of FIG. 1, or first member network device 400 of FIG. 4. Processor 602 may be any type of Central Processing Unit (CPU), microprocessor, or processing logic that interprets and executes machine-readable instructions stored in machine-readable storage medium 604. Machine-readable storage medium 604 may be a random access memory (RAM) or another type of dynamic storage device that may store information and machine-readable instructions that may be executed by processor 602. For example, machine-readable storage medium 604 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 604 may store instructions 606, 608, and 610.

In an example, instructions 606 may be executed by processor 602 to receive, by a first member network device of a virtual stack device, an input from a Multi-Active Detection (MAD) device, wherein the virtual stack device is a logical network device comprising the first member network device and a second member network device, and wherein in an event of a split in the virtual stack device, active devices are identifiable by the MAD device. Instructions 608 may be executed by processor 602 to determine, by the first member network device, whether a grace link state advertisement (LSA) is to be sent to a neighbor Open Shortest Path First (OSPF) enabled router by the first member network device, based on the input from the MAD device, wherein the neighbor OSPF enabled router is an OSPF neighbor to the virtual stack device. Instructions 610 may be executed by processor 602 to send, by the first member network device, the grace LSA to the neighbor OSPF enabled router, in response to a determination that the input from the MAD device indicates a failure of the second member network device.

For the purpose of simplicity of explanation, the example method of FIG. 5 is shown as executing serially, however it is to be understood and appreciated that the present and other examples are not limited by the illustrated order. The example systems of FIGS. 1, 2, 3, 4, and 6, and method of FIG. 5 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

The invention claimed is:

1. A method comprising:
receiving, by a first member network device of a virtual stack device, an input from a Multi-Active Detection (MAD) device, wherein the virtual stack device is a logical network device comprising the first member network device and a second member network device, and wherein in an event of a split in the virtual stack device, active devices are identifiable by the MAD device; and
determining, by the first member network device, whether a grace link state advertisement (LSA) is to be sent to a neighbor Open Shortest Path First (OSPF) enabled router by the first member network device, based on the input from the MAD device, wherein the neighbor OSPF enabled router is an OSPF neighbor to the virtual stack device.

2. The method of claim 1, further comprising:
suppressing, by the first member network device, transmission of the grace LSA to the neighbor OSPF enabled router, in response to a determination that the input from the MAD device indicates a stack link failure between the first member network device and the second member network device.

3. The method of claim 1, further comprising:
sending, by the first member network device, the grace LSA to the neighbor OSPF enabled router, in response to a determination that the input from the MAD device indicates a failure of the second member network device.

4. The method of claim 3, further comprising:
receiving, by the first member network device, an acknowledgment message from the neighbor OSPF enabled router in response to the grace LSA.

5. The method of claim 3, further comprising:
assuming, by the first member network device, a role of an active device in the virtual stack device, wherein the active device manages a control plane in the virtual stack device.

6. A first member network device of a virtual stack device, comprising:
a processor; and
a memory including instructions that, when executed by the processor, cause the first member network device to:
receive an input from a Multi-Active Detection (MAD) device, wherein the virtual stack device is a logical network device comprising the first member network device and a second member network device, and wherein in an event of a split in the virtual stack device, active devices are identifiable by the MAD device;
determine whether a grace link state advertisement (LSA) is to be sent to a neighbor Open Shortest Path First (OSPF) enabled router by the first member network device, based on the input from the MAD device, wherein the neighbor OSPF enabled router is an OSPF neighbor to the virtual stack device; and suppress transmission of the grace LSA to the neighbor OSPF enabled router, in response to a determination that the input from the MAD device indicates a stack link failure between the first member network device and the second member network device.

7. The first member network device of claim 6, wherein the first member network device is a standby device in the virtual stack device under control of the second member network device that manages a control plane in the virtual stack device.

8. The first member network device of claim 6, wherein the virtual stack device is coupled to the OSPF enabled router via link aggregation group (LAG) ports.

9. The first member network device of claim 6, wherein the virtual stack device forms an adjacency with the OSPF enabled router.

10. The first member network device of claim 6, wherein the input from the MAD device is based on Simple Network Management Protocol (SNMP).

11. The first member network device of claim 6, wherein the first member network device reboots after the determination engine suppresses transmission of the grace LSA to the neighbor OSPF enabled router.

12. A non-transitory machine-readable storage medium comprising instructions, the instructions executable by a processor to:

receive, by a first member network device of a virtual stack device, an input from a Multi-Active Detection (MAD) device, wherein the virtual stack device is a logical network device comprising the first member network device and a second member network device, and wherein in an event of a split in the virtual stack device, active devices are identifiable by the MAD device;

determine, by the first member network device, whether a grace link state advertisement (LSA) is to be sent to a neighbor Open Shortest Path First (OSPF) enabled router by the first member network device, based on the input from the MAD device, wherein the neighbor OSPF enabled router is an OSPF neighbor to the virtual stack device; and send, by the first member network device, the grace LSA to the neighbor OSPF enabled router, in response to a determination that the input from the MAD device indicates a failure of the second member network device.

13. The storage medium of claim 12, wherein the first member network device and the second member network device are coupled via a stack link.

14. The storage medium of claim 12, wherein the second member network device is an active device in the virtual stack device that manages a control plane in the virtual stack device.

15. The storage medium of claim 12, wherein the split is caused due to a stack link failure between the first member network device and the second member network device.

16. The storage medium of claim 12, wherein the MAD device is one of a network switch or a router.

17. The storage medium of claim 12, wherein the MAD device is individually coupled to the first member network device and the second member network device.

18. The storage medium of claim 17, wherein the MAD device is individually coupled to the first member network device and the second member network device via Link Layer Discover Protocol (LLDP) links.

19. The storage medium of claim 17, wherein the MAD device is individually coupled to the first member network device and the second member network device via out-of-band management (OOMB) links.

20. The storage medium of claim 17, wherein the first member network device and the second member network device are OSPF enabled routers.

\* \* \* \* \*